United States Patent [19]
Wu

[11] Patent Number: 5,912,317
[45] Date of Patent: *Jun. 15, 1999

[54] OXAZOLIDINE-BASED HARDENERS FOR THE ROOM TEMPERATURE CURE OF RESORCINOL RESINS IN THE BONDING OF WOOD ARTICLES—II

[75] Inventor: Gaoming Wu, Wheeling, Ill.

[73] Assignee: ANGUS Chemical Company, Buffalo Grove, Ill.

[ * ] Notice: This patent is subject to a terminal disclaimer.

[21] Appl. No.: 08/915,522

[22] Filed: Aug. 15, 1997

Related U.S. Application Data

[63] Continuation-in-part of application No. 08/825,870, Apr. 2, 1997.

[51] Int. Cl.⁶ .............................. C08G 8/04; C08G 14/02
[52] U.S. Cl. .............................. 528/129; 528/94; 528/95; 528/403; 528/423; 528/425; 525/139; 525/140; 524/492; 524/493; 548/110
[58] Field of Search .............................. 528/129, 94, 95, 528/403, 423, 425; 525/139, 140; 524/492, 493; 548/110

[56] References Cited

U.S. PATENT DOCUMENTS

| | | | |
|---|---|---|---|
| 3,600,353 | 8/1971 | Baker | 260/38 |
| 3,705,832 | 12/1972 | Stephan et al. | 156/310 |
| 4,034,012 | 7/1977 | Gillern | 260/828 |
| 4,061,620 | 12/1977 | Gillern | 260/29.3 |
| 4,175,065 | 11/1979 | Andersson | 260/29.3 |
| 4,373,062 | 2/1983 | Brown | 524/841 |
| 4,942,191 | 7/1990 | Rogers | 524/17 |
| 5,532,330 | 7/1996 | Pizzi et al. | 528/125 |

FOREIGN PATENT DOCUMENTS

| | | | |
|---|---|---|---|
| 0 639 608 A1 | 2/1995 | European Pat. Off. | C08H 5/00 |
| 0 648 807 A1 | 4/1995 | European Pat. Off. | C08K 11/00 |
| 0 666 296 A1 | 8/1995 | European Pat. Off. | C09J 161/06 |
| 06088010 | 3/1994 | Japan | C08L 61/06 |

OTHER PUBLICATIONS

Herfindal, Larry, *Radio Frequency Wood Gluing,* HB Fuller Company, Aug. 1990.

*Primary Examiner*—Duc Truong
*Attorney, Agent, or Firm*—Arnold White & Durkee

[57] ABSTRACT

An improved oxazolidine-based hardener to be used with a resorcinol resin or a tannin resin as the adhesive for the bonding of wood articles. Preferably, an oxazolidine is combined with particulate silica, and the resin is combined with a base such as NaOH. The adhesive based on the improved hardener can be used to glue wood particles to pass wet strength requirements after the glue is cured at room temperature for under 24 hours. The improved hardener composition is storage stable; it can be prepared anytime before its use and, thus, eliminate the need to prepare a hardener immediately prior to the glue use. Since it is formaldehyde-free; it eliminates the safety issues associated with handling formaldehyde or paraformaldehyde. Also, the hardener provides flexible gel time or working time. Since the resins can be cured at room temperature, heating in an oven is not needed but could be used to reduce curing time. If radio frequencies are used to cure the resins, the exposure time can be reduced.

29 Claims, No Drawings

OXAZOLIDINE-BASED HARDENERS FOR THE ROOM TEMPERATURE CURE OF RESORCINOL RESINS IN THE BONDING OF WOOD ARTICLES— II

CROSS-REFERENCE TO RELATED APPLICATION.

This is a continuation-in-part of U.S. application Ser. No. 08/825,870, filed on Apr. 2, 1997, now abandoned.

BACKGROUND OF THE INVENTION

Wood is one of the most commonly used natural materials and there is still a relatively abundant supply. As more and more articles are being made of wood, however, the reduction in the supply of large trees and of high quality trees is becoming more serious. Therefore, the forest and lumber industry is trying to make the best use of wood through the use of synthetic adhesives. Examples of articles which use adhesives include particle board, plywood, oriented strand board, laminated beams, I-beams, and other engineered woods. An added advantage of making wood products with an adhesive system is that the so-produced woods are sometimes much stronger than natural woods because of the higher physical and chemical stability and the higher strength of glue relative to wood.

One of the most commonly used adhesives in the wood bonding industry is based on phenolic resins. A typical phenolic resin is made from the condensation polymerization of phenol with formaldehyde in the presence of a catalyst such as NaOH. Presently, numerous phenolic resins are tailor-made to suit different types of wood and for different shapes of wood articles. Traditional phenol-formaldehyde resins are chemically not reactive enough, so they have to be cured or used at high temperatures. The use of high temperature not only consumes a lot of energy, but also generates safety issues. The use of high temperatures can cause volatile organic compounds, called VOC's, to evaporate in the ovens. These often toxic vapors eventually end up being released into the environment, mainly through stack emissions. Another safety concern with traditional phenolic resins is that they always contain some formaldehyde, which is a carcinogen.

If an adhesive can be cured at room temperature, capital and operating costs can be reduced. Therefore, phenolic resin manufacturers and wood manufacturers have concentrated their efforts on developing better adhesives that can cure at room temperature and that are safer to handle and use than traditional phenolic adhesives. The most promising technology that is presently being used is a two component resorcinol adhesive. One part is a resorcinol-formaldehyde resin that is deficient in formaldehyde; and the other is simply formaldehyde or a formaldehyde donor. This adhesive takes advantage of the high reactivity of resorcinol so as to make possible the curing of the adhesive at room temperature.

Initially, resorcinol-formaldehyde resins were used for these applications. To reduce the impact of the high cost of resorcinol, phenol was later introduced to partially replace some of the resorcinol in the resin. Presently, phenol-resorcinol-formaldehyde resins are widely used as the adhesive for wood bonding purposes. In this two part adhesive system, one part is usually formaldehyde or paraformaldehyde, called the hardener in the industry. The use of formaldehyde or paraformaldehyde is essential for the adhesive to work. Formaldehyde and paraformaldehyde bring with them a lot of safety issues, however, since they are both carcinogens. The transportation, storage, handling, exposure, and stack emissions of these harmful compounds are closely watched by EPA and various other governmental bodies. Paraformaldehyde is presently the most commonly used hardener for resorcinol resins. Paraformaldehyde is a powder, and is extremely difficult to work with because the dust is very hard to control. It is very toxic and readily decomposes and releases formaldehyde, which is very difficult to work with. Thus, the handling of paraformaldehyde is not very safe and requires special attention. Another disadvantage of paraformaldehyde is that it normally has to be prepared as a dispersion just immediately prior to its use. This is because such dispersions can easily settle and decompose to formaldehyde, which evaporates into the air, resulting in a concentration change of the active ingredient. Therefore, the industry typically has to prepare the dispersion, then use it within a short period of time in order to maintain consistent performance and avoid settling and down time. Therefore, the resorcinol resin-paraformaldehyde adhesive system permits curing at room temperature, but it has not addressed the safety issues of dusting and toxicity.

Recent efforts of wood manufacturers and adhesive manufacturers have been directed to developing hardeners to replace paraformaldehyde, so as to eliminate the dusting, toxicity and safety problems associated with paraformaldehyde and formaldehyde. One of the most promising technologies is based on oxazolidine chemistry. Oxazolidines are made from amino alcohols with formaldehyde. An oxazolidine can be very stable, and no free formaldehyde can be detected. Therefore, its transportation does not present any exposure problems. An oxazolidine is believed to react with resorcinol through chemical transfer, which means that the formaldehyde will only leave the amino alcohol molecule when it is in direct contact with a resorcinol molecule. The whole transfer process does not involve any formation of formaldehyde and, thus, completely eliminates all the safety issues of paraformaldehyde handling, workplace exposure and emissions. It also does not have the settling problem associated with paraformaldehyde and, thus, increases product consistency and reduces down-time. Resorcinol resin-oxazolidine-type adhesives represent a tremendous improvement over resorcinol resin-paraformaldehyde systems, and so have gained popularity.

Current oxazolidine hardeners used by the industry, however, have some limitations. A major deficiency of oxazolidine-based hardeners is that the hardener is unable to cure a resorcinol resin at room temperature in less than 24 hours and achieve a strong bond passing the required wet strength (ASTM D 2559). Under similar conditions, paraformaldehyde-based hardeners can cure a resorcinol resin very efficiently at room temperature within 24 hours and provide the needed wet strength. Another limitation is that the oxazolidine-based hardeners typically have a much shorter gel time or working time relative to that of paraformaldehyde-based hardeners.

Therefore, it has been the concern of the present inventor to provide a liquid hardener to be used with a resorcinol resin as an adhesive that can cure at room temperature within 24 hours to glue wood articles and which produces strong gluelines with improved wet strength. Also, a new liquid hardener should eliminate the safety hazards of formaldehyde and paraformaldehyde and increase the gel time for the gluing of wood articles.

SUMMARY OF THE INVENTION

The present invention provides an improved hardener composition to be used at room temperature with a resorcinol resin for bonding wood articles.

The improved hardener comprises, among others, three ingredients: as a formaldehyde donor, an oxazolidine with the formulas shown below; a base in an amount sufficient to retard the reaction of oxazolidine with resorcinol resin; and an effective amount of an efficient sorbent. By the term "sorbent" is meant an additive which can retain water and/or oxazolidine and, in combination with a base, is capable of improving the wet strength of wood laminated with resorcinol resins. Water is also required, although generally it is used in larger amounts than are needed for the hardener to cure the resorcinol resin.

Examples of efficient sorbents suitable for this invention are those derived from vegetable matter, including hydroxyethyl cellulose, hydroxypropyl cellulose, methyl cellulose, corn meal flour, rice powder, soy flour, and wheat flour, as disclosed in parent Application No. 08/Not Assigned. Another type of sorbent which has been found useful is fine silica powder or, alternatively, colloidal silica. The sorbent preferably is mixed with the oxazolidine, but it can also be mixed with the resorcinol resin. Alternatively, the sorbent can be added either to the hardener before mixing with the resin, or it can be added immediately prior to the use of the glue after the other components have been mixed with the resin.

The base may be either organic or inorganic. An inorganic base is preferred, for example, NaOH, KOH, LiOH, MgO, $Ba(OH)_2$, $Ca(OH)_2$, CaO, $Mg(OH)_2$, $Al(OH)_3$, and CsOH. The base is preferably mixed with the resorcinol resin, but it can also be mixed into the other components of the oxazolidine hardener.

Examples of resorcinol resins which may be used with this improved hardener are resorcinol-formaldehyde resins, phenol-resorcinol-formaldehyde resins, tannin resins, tannin-phenol-formaldehyde resins, and tannin-formaldehyde resins.

The use of the improved hardener with a resorcinol resin produces a strong bond between the adhesive and wood after being cured for under 24 hours at room temperature. The glued wood article is water-resistant, as demonstrated by the three cycles of vacuum-pressure treatments according to ASTM D 2559. The hardener is stable and can be made anytime before its use. There is no need to prepare the hardener immediately before its use, as was the case with conventional paraformaldehyde hardeners. It eliminates the need to deal with toxic paraformaldehyde powder and its dusting. Operational consistency is improved because of the higher stability of the hardener and the elimination of settling of solid paraformaldehyde powders to the bottom of the hardener during storage and application. In another aspect, the invention provides a hardener that affects the gel time so that more operational flexibility is achieved during the application of the adhesive. The improved hardener for resorcinol resins can be used with radio frequency curing or with oven curing for improved productivity, higher wet strength and stronger adhesion. Lower temperatures and shorter times are possible, while still achieving the desired degree of cure.

The invention in another aspect is an improved two part adhesive system, of which one part is a resorcinol resin and the other is a hardener. The improved adhesive composition may be used for gluing of wood articles, such as laminated beams, I-beams, engineered woods, particle board, oriented strand board, and plywood. More specifically, the adhesive system will cure at room temperature, although radio frequency curing or oven curing can be used if desired. It is formaldehyde-free and produces bonds with a high wet strength.

DETAILED DESCRIPTION OF THE PREFERRED EMBODIMENTS

PHENOLIC RESINS AND RESORCINOL RESINS

Phenolic resins and resorcinol resins are widely used as adhesives for wood articles. Resorcinol resins are condensation products of formaldehyde or other aldehydes with resorcinol or a resorcinol derivative, such as tannin. Phenols may be included in such resins. Examples include resorcinol-formaldehyde resins, phenol-resorcinol-formaldehyde resins, tannin resins, tannin-formaldehyde resins, and tannin-phenol-formaldehyde resins. A resorcinol resin is produced in the presence of a small amount of base, and the final pH of the resin is around 5–8. Typically these resins are solutions in a mixture of solvents. Resorcinol resins as made are deficient in formaldehyde. This is done because the resin will undergo reaction even at room temperature and cause premature gelling if more formaldehyde is present. Therefore, a resorcinol resin has to be used with another component called a hardener to be useful as an adhesive.

HARDENER COMPOSITION

Presently, industrial practice is to use formaldehyde, paraformaldehyde, or oxazolidine as the active ingredient in hardeners. The disadvantages of using formaldehyde or paraformaldehyde have been discussed above. Oxazolidines have been used since they can provide formaldehyde to cure resorcinol resins. The improved hardener of this invention comprises, among others, the following three ingredients.

I. As a formaldehyde donor, an oxazolidine with the general molecular structure shown below.

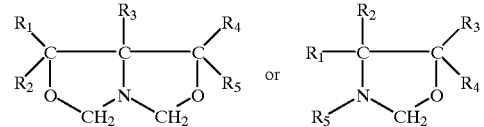

in which $R_1$, $R_2$, $R_3$, $R_4$ and $R_5$ are independently hydrogen, hydroxyl, branched or straight chain alkyl, or branched or straight chain hydroxyl alkyl.

Thus, the oxazolidine can be monocyclic or bicyclic. The preferred alkyl groups for $R_1$ to $R_5$ are methyl, ethyl or hydroxyl methyl. Preferred bicyclic oxazolidines are substituted only at the $R_3$ position, and preferred monocyclic oxazolidines are substituted only at the $R_1$ and $R_2$ positions. A particularly preferred oxazolidine is 5-hydroxymethyl-1-aza-3, 7, -dioxabicyclo [3, 3, 0]octane (Zoldine® ZT-55, Zoldine® ZT-100, Zoldine® ZT-65, and Zoldine® ZT-40, ANGUS Chemical Company).

The hardener can contain more than one oxazolidine, so a mixture of two or more oxazolidines can be used simultaneously, for example, to achieve flexibility in gel time.

II. A base which can retard the reaction of oxazolidine with resorcinol resin, preferably an inorganic base, although organic bases may be used. Inorganic bases suitable for this application include NaOH, KOH, LiOH, MgO, $Ba(OH)_2$, $Ca(OH)_2$, CaO, $Mg(OH)_2$, $Al(OH)_3$, and CsOH. The base may either be mixed with the hardener or, preferably, premixed with the resorcinol resin.

III. An efficient sorbent. In the context of this invention, a sorbent is a material which can retain water and/or oxazolidine and which, in combination with a base, is capable of increasing wet strength of wood laminated with resorcinol resins. In one embodiment, the sorbent may be reasonably flexible; i.e., not rigid but compressible, in both dry and wet conditions, and is reasonably swellable in aqueous oxazolidine solutions. Examples of such sorbents are derived from vegetable matter, including hydroxyethyl cellulose, hydroxypropyl cellulose, methyl cellulose, corn flour, rice powder, soy flour, and wheat flour. In another embodiment, a different type of solid sorbent is used, particulate silica. It may be classed with the porous sorbents derived from vegetable matter, even though it is not porous or compressible because it is capable of holding water and/or oxazolidine on the surface of the silica particles. Silica does, however, improve the wet strength of laminated wood, as will be seen in the Examples below.

The sorbent can either be soluble (e.g., the cellulose derivatives) or insoluble (e.g., silica), as well as partially soluble (e.g., wheat flour). If the sorbent is soluble, it is preferably added just prior to the use of the glue. If the sorbent is insoluble, or close to insoluble in aqueous oxazolidine, it may be mixed with the oxazolidine any time before its use. Consequently, particulate silica or wheat, corn, soy flours, rice powder, and related grain flours are preferred since they provide the convenience of premixing the hardener. The hardener will also include an effective amount of water, which is needed for the curing reaction. Typically, however, it will be used in significantly larger amounts.

The hardener makes it possible to cure resorcinol resin at room temperature while substantially improving the wet strength, which was a surprising discovery. Although we are not sure why and how this hardener works, we believe the improved performance can be related to several factors: for example, better penetration of the adhesive into the wood; increased reactivity of the phenolic resin at room temperature, and the slow release of oxazolidine and water into the glueline during curing.

One modification introduced in the improved hardener of this invention is the addition of a certain amount of an organic base or an inorganic base, such as NaOH, to the resorcinol resin. A highly basic adhesive mixture may have three effects. First, a higher pH slows down the chemical transfer of formaldehyde from an oxazolidine molecule to a resorcinol molecule. This is demonstrated by a longer gel time for the glue when an inorganic base is used as shown in the examples below. A longer gel time would give the adhesive more time to penetrate into the interior pores of the wood. This can be very important, especially when the gel time of the adhesive is very short as in the case of current oxazolidine-based adhesives. Another possible benefit is that the increased basicity would increase the reactivity of the phenolic portion of a phenol-resorcinol-formaldehyde resin (PRF). A PRF resin has a more reactive resorcinol portion and a much less reactive phenolic portion. It is often very difficult to generate a fast reaction between formaldehyde and the phenolic portion of a PRF resin at room temperature. It is well known that a higher pH would favor the reaction between a phenolic resin and formaldehyde. The third possible benefit is that the presence of a base may help to break up some of the highly crystalline structures of the wood at the wood-glue interface. Such a loosening-up of the wood may help to develop a stronger adhesion between the wood and the glue.

The introduction of a sorbent may have the following positive contributions to the adhesive. First, it provides an environment for the slow release of water to facilitate the reaction between oxazolidine and the resorcinol resin in the glueline during curing. This can be understood based on the following reaction.

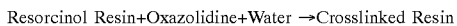

Resorcinol Resin+Oxazolidine+Water →Crosslinked Resin

Without water present in the vicinity, the oxazolidine ring would not open and reaction with a resorcinol resin would be impossible. Although a high percentage of water is present in the current commercial adhesives based on oxazolidine chemistry, the use efficiency of the water in these systems is believed to be low, considering the absence of an efficient water sorbent, the long press time (up to 24 hours) and the high pressure used to press the adhesive and the surrounding wood. Thus, under pressure and during a long cure time, much of the water may be squeezed out of the glueline and into the wood. Therefore, much of the water is no longer in direct contact with the glue in the glueline. This would be similar to a filtering process, and most of the water is probably "filtered out" of the glueline under the applied pressure. Evidence from people who are familiar with the art is that oxazolidine-based hardeners are not very efficient with radio frequency curing. Radio frequency works well only when enough water is present. The sorbents can also absorb and release oxazolidine in a similar manner. Although the oxazolidine molecules are larger than water, they may also be squeezed out of the glueline into the wood under pressure.

It has not been determined how much water must be sorbed. Its crystalline structure and the presence of hydrogen-bonding (H-bonding), may explain why wood flour is not a good sorbent. As demonstrated in the Examples, a hardener containing cellulose microcrystallites, another rigid sorbent, does not generate a bond with good wet strength. Cellulose derivatives, such as hydroxyethyl cellulose and methyl cellulose, are soft and good sorbents. Most of these cellulose derivatives, however, are soluble. Even when only a small amount is used, a very high viscosity will result immediately. This property of being soluble in water makes it extremely difficult for soluble sorbents to be used commercially. Another type of sorbent is based on starch or grain materials. Wheat flour, either whole grain or all purpose white wheat flour, is mostly insoluble, and it is reasonably compressible when it is dry and wet. It swells in water and oxazolidine water mixtures, but does not easily dissolve. This property makes it an ideal additive since it can be used to prepare a stable hardener. Therefore, grain flour sorbents are preferred in this invention, such as wheat, corn, soy flours, and rice powder.

While it has been believed that rigid sorbents were less effective, particulate silica has been found to serve as an effective sorbent in this application, even though it is not porous and of vegetable origin, as is the case with the cellulose derivatives and the grain flours. The silica particles, which preferably will have a size of about 0.001–20 $\mu$m and a surface area of about 20–1,000 $m^2$/gm, hold water and/or oxazolidine on their surface and may be considered sorbents in the meaning of that term in this invention. One form of silica which may be used successfully is colloidal silica, which may be considered sorbent silica in the presence of water.

Particulate silica may also be used in conjunction with thickeners to limit the tendency of solid particles to settle and, therefore, to improve consistency of the adhesives performance. One such thickener is methyl cellulose, which can be classed as a soluble sorbent as discussed above, but which is used in very small quantities as a thickener with hardeners containing silica particles.

Thus, silica particles may be used alone or in combination with colloidal silica and/or thickeners, such as methyl cellulose. Alternatively, colloidal silica may be used alone or in combination with particulate silica and/or thickeners, such as methyl cellulose. The fact that colloidal silica is an effective sorbent is considered significant, since it is already in the presence of a substantial amount of water even before mixing into the resorcinol resin. Thus, it may be concluded that the ability of a sorbent to hold water and/or oxazolidine is more important than its source. In formulated resorcinol resin glues, water is introduced with several of the ingredients.

Another very important possible benefit from the introduction of a sorbent is that it may create an environment for the slow release of the oxazolidine along with the water in the glueline during curing. The use of the slow release or addition of one reactant is well known and often used in organic synthesis. When two reactants participate in a reaction, the drop-wise addition of one reactant to the other can change the chemical structures and, thus, properties of the product due to the difference in kinetics and reaction mechanisms. In the case of an adhesive, this may help the formation of more evenly distributed crosslinking and possibly higher crosslinking density. This can result in improved physical properties and better wet strength. The slow release of oxazolidine will also slow down the reaction with the resorcinol resin, thus increasing the gel time.

One very important performance parameter for any adhesive is its gel time or working time. Depending on the application and the specific equipment at a particular plant location, the gel time of an adhesive is often specified to be in a certain range. For example, the gel time for a two part resorcinol-based adhesive is normally controlled to be from 30 minutes to a few hours time. If the gel time is too short, the adhesive would not give the operators or machines enough time to spread the glue and still leave enough time to clamp or press the glued wood. On the other hand, a too long gel time would not be desired. If the gel tine is too long, the glue does not harden for a long period of time even after the wood has been clamped and pressed. It will also result in a longer time for the glued boards to be cured.

In the Examples, the gel time in each case was measured at room temperature simply by counting the time difference from the time when the hardener is added to the resorcinol resin (immediately mixed) to the time when the adhesive is unable to form a continuous string when it is lifted up with a tongue depressor.

ADHESIVE FORMULATION

The adhesive composition of the invention is a two part system, that is, the resorcinol resin and the hardener. The composition of both parts may vary significantly, and they will be determined by the time and temperature to be used for curing, and the reactivity of the resin and the hardener. In general, the hardener will represent about 10–60 wt. % of the adhesive and the resin about 90–40 wt. %. A preferred adhesive will contain about 60–80 wt. % of the resin.

The resin reactivity will depend on the degree to which the preliminary polymerization between resorcinol, phenol, and the aldehyde has proceeded, the type of aldehyde used, the relative ratio of resorcinol to phenol, and the amount of catalyst. When related compounds such as phenol derivatives or tannins are included, the reactivity will also be affected.

The reactivity of the hardener composition will be affected by the type and amount of oxazolidine(s) chosen, the amount and type of base, and the amount and type of sorbent used. When mixed, the hardener will contain about 10–80 wt. % of the oxazolidine, 0.5–30 wt. % of the base, and 0.5–30 wt. % of the sorbent (on a water-free basis). In one preferred embodiment, the hardener will contain about 35–45 wt. % of the oxazolidine, 4–8 wt. % of the decelerator, e.g., NaOH, and 10–20 wt. % of the sorbent, e.g., wheat flour or silica. At least three methods of combining the components into a curable composite are preferred. In one method, all the components of the hardener are premixed and later mixed with the resorcinol resin. In the second method, the base is premixed with the resorcinol resin, which is subsequently combined with the remaining components of the hardener. In the third method, the sorbent is added last, that is, after the other hardener components have been mixed with the resorcinol resin.

In some cases, it has been found desirable to add a thickener to control the viscosity of the hardener or the formulated resin. In the Examples below, methyl cellulose has been used for this purpose. It has previously been suggested to function as a sorbent, although insoluble or partially soluble sorbents are preferred. When used as a thickener, the methyl cellulose is used in very small amounts so that, at most, it supplements the other sorbents which are used. Methyl cellulose is only an example of possible thickeners, which include, but are not limited to, hydroxyethyl cellulose and hydroxypropyl cellulose.

Other additives may be included to improve certain properties of the hardener, which include, but are not limited to, wood flour, mineral clay, and polyvinyl acetate.

APPLICATION OF ADHESIVES TO WOOD BONDING

Inferior or small pieces of wood can be glued together to make them more useful materials for the construction and furniture industries. Examples of these applications are laminated beams, I-beams, engineered woods, particle board, oriented strand board, and plywood. Gluing wood pieces together involves applying the adhesive and then applying pressure until a full cure is completed. Hardeners which use paraformaldehyde may be cured at room temperature, but other hardeners, such as those including oxazolidines, have required heating to achieve a satisfactory cure. The adhesive of the present invention can be cured at room temperature while achieving improved wet strength as defined by ASTM D 2559.

When an adhesive is used to glue woods, the glued-up woods must be able to withstand high moisture, humidity, rain and hot weather. This is very critical since a glued-up wood used in construction must be stable for many years. For the measurement of the wet strength of an adhesive, industry standard testing methods have been developed for different types of adhesives and applications. Testing method ASTM D 2559 "Standard Specification for Adhesive for Structural Laminated Wood Products for Use Under Exterior (Wet Use) Exposure Conditions" was chosen to show the performance improvements of our invention. The main reason for choosing this method is that the current commercial oxazolidine-based resorcinol resins generally have poor wet strength and, thus, usually require oven-curing.

The type of wood chosen for the measurement of wet strength in the Examples given below is Douglas Fir, having the dimensions I inch thick, 6 inches wide and 13 inches long (25.4×152.4×330.2 mm.). The wood was first conditioned for at least a week in a humidity chamber at 23° C. and 65% relative humidity before being tested for wet strength, according to specifications set forth by ASTM D 2559. The wood boards were freshly surfaced before bonding (always within 24 hours of bonding). For each set of experiments, a total of 6 pieces of this wood were used to prepare one laminated wood sample. Separately, if necessary, each particular hardener was prepared according to the specific formula to be tested. Then, it was mixed with a resorcinol resin and other additives when needed. The mixed glue was applied on each face of the board to be bonded with about 0.23 g of glue for each square inch of wood area. This step normally took 5–15 minutes.

The six pieces of wood were assembled, left at room temperature for 5–10 minutes, and then pressed to a pressure of about 500–1,000 pounds (227–454 kg). After 5–10 minutes, the pressure was increased to 12,000 pounds (5455 kg,). After waiting for about 5–20 minutes (when gel time allowed), the pressure would normally drop to about 8,000 pounds (3636 kg), and it was adjusted back to 12,000 pounds (5455 kg). After the wood sample had been pressed at room temperature for about 7–15 hours, it was then cut to the right size (3×5 inches) (76.2×127 mm) and stored in the humidity chamber waiting to be tested for wet strength.

The testing procedure for wet strength used in the Examples was identical to that described in ASTM D 2559. Briefly, it comprises three cycles of vacuum, pressure, steam and dry treatments during a period of 3 days. For all our Examples, the cure time, i.e., the time from gluing to the time when the wet strength test was started, was from 15–24 hours. Therefore, the curing in each case was at room temperature for less than 24 hours. At the end of the three cycle treatments, wet strength expressed by delamination was calculated for each glueline and for the five gluelines all together.

According to ASTM D 2559 testing method and industry standards, laminated wood products must meet the following two requirements in order to be certified for exterior use.

A. The total delamination of the five gluelines must not be higher than 5%.

B. The delamination in each individual glueline must not be higher than 1%.

The degree of delamination is measured along two sides of each sample across the grain of the wood.

EXAMPLE I
(COMPARATIVE)

A commercial adhesive, representing the present state of the art, was tested for wet strength and gel time. Therefore, to 85 g of a commercial phenol-resorcinol-formaldehyde resin was added 35.8 g of an associated commercial oxazolidine-based hardener. It was then mixed at room temperature for about 3 minutes. This glue was used to laminate 6 plies of 1 inch thick, 6 inch wide and 13 inch long (25.4×152.4×330.2 mm) Douglas Fir wood, then cured at room temperature for 24 hours, and finally tested for wet strength according to the ASTM D 2559 method described earlier. The wet strength results expressed in percent delamination for each glueline and for all the gluelines together are given in Table 11. The results demonstrated that the present commercial resorcinol adhesive based on a PRF resin and oxazolidine hardener does not meet wet strength requirements when the glue is cured at room temperature for 24 hours. Total delamination of 67% failed to meet the test requirements of less than 5%. In addition, it was noticed that, even for those 30% of the gluelines thought to be un-delaminated, the glueline was found to be very weak and loosely bonded when examined closely.

This glue was also checked for gel time and the result is given in Table II. A gel time of 24 minutes is short by industry standards. Often a longer gel time than this is preferred to allow for more working time and more flexibility in operation.

EXAMPLE 2

A. A hardener was first prepared by gradually adding 36 g of wheat flour to 137.1 g of Zoldine® ZT-65 (ANGUS Chemical Company) and 15 g of water at room temperature, then mixing for 1 hour at room temperature.

Separately, 120 g of the phenol-resorcinol-formaldehyde resin of Example 1 was mixed with 4.6 g of 85% KOH for about 10–30 minutes while cooling the resin in a 5–25° C. water bath. To this resin was added 44.3 g of the hardener prepared above, and then they were mixed for about 3–5 minutes. This glue was used to laminate 6 plies of 1 inch×6 inches×13 inches (25.4×152.4×330.2 mm) Douglas Fir wood, then cured at room temperature for 24 hours, and finally tested for wet strength as in Example 1. The results given in Table II show the delamination for each glueline and for all the gluelines. Clearly, with the introduction of KOH and wheat flour according to our invention, wet strength improved dramatically from ~70% total delamination to below 1% total delamination. In fact, the improved hardener has passed both requirements set by ASTM D 2559, i.e., the delamination of each individual glueline is below 1% and the total delamination for all 5 gluelines is below 5%. Therefore, the present invention shows great promise for commercial use.

The above glue was also tested for gel time according to the procedure described earlier. The result is given as Example 2 in Table II. Gel time increased to 75 minutes from just 24 minutes of the glue without this modification (Example 1).

Although the KOH in this Example was added to the PRF resin, in practice it can also be added to the hardener any time prior to the use of the hardener. Similarly, the wheat flour can also be added to the PRF resin.

EXAMPLE 3

Example 2 was repeated, except that NaOH was used to replace KOH and the amount of NaOH, Zoldine® ZT-65, water and wheat flour was slightly different, as given in Table I. In this Example, total delamination has also improved to below 1% and gel time has lengthened to 77 minutes. Even though NaOH is slightly less basic, it was found to be equally effective in improving wet strength.

EXAMPLE 4

Example 2 was repeated, except that Ca(OH)$_2$ was used to replace KOH, and the amount of Ca(OH)$_2$, Zoldine® ZT-65, water and wheat flour was slightly different, as given in Table I. In this Example, gel time is shown to have been increased to 60 minutes, and total delamination improved to about 30%. Since Ca(OH)$_2$ is not as effective as NaOH and KOH, it suggests that a base with lower basicity is less effective for wet strength improvement.

EXAMPLE 5

Example 2 was repeated, except that ground corn meal was used to replace wheat flour. The results from this Example, as given in Table II, show that corn meal works equally well as wheat flour in improving the wet strength and gel time.

EXAMPLE 6

To 120 g of the resorcinol resin of Example 1 was added 3.5 g of water and 4.6 g of 85% KOH. While cooling the mixture in a 20–25° C. water bath, the resin was mixed for about 20 minutes with a mechanical stirrer. Then, 32.3 g of Zoldine® ZT-65 was added and mixed with the glue for about 3 minutes. Finally, 8.5 g of hydroxyethyl cellulose (HEC) was added and mixed for about 3 minutes. This glue was used to laminate 6 plies of 1 inch×6 inches×13 inches (25.4×152.4×330.2 mm) Douglas Fir wood, then cured at room temperature for 24 hours, and finally tested for wet strength as in Example 1. The delamination results listed in Table II clearly show that this adhesive passed both wet strength requirements of ASTM D 2559. The gel time of this glue also increased to 50 minutes.

HEC is a cellulose derivative that no longer has the cellulose crystalline structure and mostly has an amorphous structure. Because of its absence of strong hydrogen bonding, HEC is easily soluble in water. The fact that HEC is soluble in water makes it much more difficult to use than wheat flour in this hardener application. Wheat flour is mostly insoluble at room temperature and, therefore, it can be used to prepare a stable hardener any time before the use of the hardener. With HEC, a stable hardener cannot be prepared many days before the use of the glue. The dissolving of HEC in the hardener can rapidly increase the viscosity of the hardener and makes it impractical even with the addition of 0.5–1% of HEC. The dissolving of HEC in water takes some time and, therefore, the glue should be mixed immediately prior to use.

EXAMPLE 7

Example 6 was repeated, except that methyl cellulose (MC) (average molecular weight 86,000) was used to replace HEC. With this Example, delamination also improved and passed both requirements required by ASTM D 2559. Since methyl cellulose is also soluble in water, it should be used by mixing the glue with the right amount of methyl cellulose immediately prior to use.

EXAMPLE 8

Example 7 was repeated, except that a smaller amount of methyl cellulose and KOH was used than in Example 7. This Example demonstrates that acceptable delamination can also be achieved with a lower amount of KOH and methyl cellulose.

EXAMPLE 9

Example 2 was repeated, except that cellulose microcrystallites were used to replace the wheat flour for the preparation of the hardener. With the replacement of wheat flour by cellulose microcrystallites, wet strength became much worse. Cellulose microcrystallites are structurally tightly packed. Because of its tight structure, it is a much less efficient sorbent. This suggests that, to be highly effective in improving wet strength, the sorbent has to be able to absorb a sufficient amount of water and/or oxazolidine. When the sorbent is reasonably soft or flexible, water can come out of the sorbent easily and react with oxazolidine and then release formaldehyde to finally crosslink the resorcinol resin. If the bonding of water to the sorbent is too tight, water cannot come out of the sorbent easily. Cellulose microcrystallites can swell somewhat in water and absorb some water, but they are very rigid and may not be soft enough to allow water to come out easily. This may be why cellulose microcrystallites are much less effective in improving wet strength.

EXAMPLE 10

Example 3 was repeated, except that no NaOH was used. The results, as shown in Table II, demonstrate that when only wheat flour is used, wet strength improvement is limited. To be effective, preferably wheat flour should be used with an inorganic base.

EXAMPLE 11

Example 1 was repeated except that 3.2% of KOH (based on resorcinol resin weight) was added. The gel time and wet strength results listed in Table II both show improvements, but the wet strength of this glue was far from meeting the two requirements set by ASTM D 2559. This also means that only when KOH is in use in combination with an efficient sorbent is an acceptable wet strength of the glue bond achievable.

EXAMPLE 12

Example 1 was repeated except that 0.5% methyl cellulose was pre-dissolved in the hardener solution. The gel time and wet strength results given in Table II show essentially no improvement, as compared to Example 1. It was also noticed that when 0.5% methyl cellulose was used, the viscosity of the glue was very high and, thus, would be impractical for commercial use. This Example demonstrated that the sorbent needs to be insoluble or partially insoluble to be effective in improving wet strength. Once the sorbent is dissolved, it has lost the ability of absorbing, holding and slow release of water mechanism, thus hindering the hardener's usefulness in achieving the right wet strength. Some cellulose derivatives are often mixed and dissolved in adhesives to achieve the right viscosity, but the current invention calls for the use of an insoluble or partially soluble sorbent; or calls for the rapid use of a soluble sorbent immediately after it is mixed with the resorcinol resin and before it is dissolved.

TABLE I

The Glue Composition for Examples 1–12

| Example Number | PRF resin[1] (g) | (g) | Zoldine ® ZT-65 (65%) (g) | 85% KOH (g) | 50% NaOH (g) | Ca(OH)$_2$ (g) | Water (g) | Sorbent Type and Amount (g) | Total Glue Weight (g) |
|---|---|---|---|---|---|---|---|---|---|
| 1 | 85 | 35.8[2] | | | | | | | 121 |
| 2 | 120 | | 32.3 | 4.6 | | | 3.5 | Wheat Flour 8.5 g | 169 |
| 3 | 120 | | 29.4 | | 5.8 | | 3.2 | Wheat Flour 7.7 g | 166 |
| 4 | 120 | | 30.2 | | | 2.7 | 6.3 | Wheat Flour 7.9 g | 167 |

TABLE I-continued

The Glue Composition for Examples 1–12

| Example Number | PRF resin[1] (g) | (g) | Zoldine ® ZT-65 (65%) (g) | 85% KOH (g) | 50% NAOH (g) | Ca(OH)$_2$ (g) | Water (g) | Sorbent Type and Amount (g) | Total Glue Weight (g) |
|---|---|---|---|---|---|---|---|---|---|
| 5 | 120 | | 32.3 | 4.6 | | | 3.5 | Corn Meal 8.5 g | 169 |
| 6 | 120 | | 32.3 | 4.6 | | | 3.5 | HEC 8.5 g | 169 |
| 7 | 170 | | 45.7 | 6.5 | | | 5.0 | MC 12.0 g | 239 |
| 8 | 120 | | 32.3 | 3.0 | | | 8.0 | MC 5.0 g | 168 |
| 9 | 120 | | 32.3 | 4.6 | | | 3.5 | Cellulose Microcrystallites 5.5 g | 169 |
| 10 | 120 | | 29.2 | | | | 3.2 | Wheat Flour 7.7 g | 160 |
| 11 | 100 | 40.0 | | | 3.8 | | | | 144 |
| 12 | 101 | 40.4 | | | | | | MC 0.5 g | 142 |

[1]Commercial phenol-resorcinol-formaldehyde resin.
[2]Commercial hardener for commercial resin of (1).

TABLE II

Wet Strength and Gel Time Results for Examples 1–12

| Example Number | Hardener Feature | | Gel Time (Mins) | Individual Glueline Delamination (%) | | | | | Total Delamination (%) |
|---|---|---|---|---|---|---|---|---|---|
| | | | | 1 | 2 | 3 | 4 | 5 | |
| 1 | Commercial Hardener | | 24 | 14.7 | 7.0 | 13.9 | 16.4 | 15.0 | 67.0 |
| 2 | Wheat Flour: KOH: | 7.1%[1] 3.3% | 75 | 0.0 | 0.3 | 0.0 | 0.3 | 0.0 | 0.6 |
| 3 | Wheat Flour: NaOH: | 6.4% 2.4% | 77 | 0.0 | 0.4 | 0.0 | 0.0 | 0.0 | 0.4 |
| 4 | Wheat Flour: Ca(OH)$_2$ | 6.6% 2.3% | 60 | 1.6 | 7.7 | 4.9 | 10.9 | 4.1 | 29.2 |
| 5 | Corn Meal: KOH: | 7.1% 3.3% | 77 | 0.0 | 0.3 | 0.0 | 0.0 | 0.0 | 0.3 |
| 6 | HEC: KOH: | 7.1% 2.1% | 50 | 0.3 | 0.3 | 0.0 | 0.3 | 0.0 | 0.9 |
| 7 | MC: KOH: | 7.1% 3.3% | 48 | 0.4 | 0.7 | 0.0 | 0.0 | 0.0 | 1.1 |
| 8 | MC: KOH: | 4.2% 2.1% | 50 | 0.0 | 0.0 | 0.3 | 0.0 | 0.8 | 1.1 |
| 9 | Cellulose Microcrystallites: KOH: | 7.1% 3.3% | 56 | 0.5 | 6.1 | 2.2 | 2.0 | 9.0 | 19.8 |
| 10 | Wheat Flour: | 6.4% | 40 | 7.4 | 7.6 | 14.1 | 4.3 | 8.1 | 41.4 |
| 11 | KOH: | 3.2% | 52 | 2.4 | 4.9 | 3.9 | 3.3 | 2.9 | 17.4 |
| 12 | MC: | 0.5% | 23 | 13.3 | 7.7 | 15.1 | 15.0 | 12.4 | 63.5 |

[1]Use level is expressed in the percentage of PRF resin.

EXAMPLE 13

(COMPARATIVE)

A second commercial phenol-resorcinol-formaldehyde resin was mixed with an associated commercial oxazolidine-based hardener and KOH and used to laminate 6 plies of wood following the procedures of Example 1. The composition is given in Table III and the results of the wet strength test in Table IV. The performance was similar to that of Example I, that is, substantial delamination occurred.

EXAMPLE 13A

Example 13 was repeated, except that the commercial hardener was replaced by ZT®-65 oxazolidine. The gel time was much shorter than the hardeners containing a base, indicating that the use of a base is important in practical applications of the invention.

EXAMPLE 14

The commercial resorcinol resin of Example 13 was mixed with a hardener consisting of Zoldine® ZT-65 (ANGUS Chemical Company), with KOH and then water and, as a sorbent, Silprec® U-23 (PPG Industries), which is a fine silica powder having an average surface area of 360 m$^2$/g. Again, the resin and hardener were mixed and used to laminate wood as in Example 13. The composition is listed in Table III and the wet strength results in Table IV. The wet strength was much improved compared with the commercial hardener of Example 13.

EXAMPLE 15

Example 14 was repeated, except that Cab-O-Sil EH-5 (Cabot Corp.) replaced Silprec® U-23. This silica powder had a similar average surface area, 380 m$^2$/g, and an average particle size of 0.25 μm. As will be seen from Table IV, the results were similar to those of Example 14.

EXAMPLE 16

Example 14 was repeated, except that Acematt® HK400 (Degussa Corp.) was used as a source of silica particles. The average surface area of this silica powder is 190 m²/gm and the average particle size 6 μm. The results reported in Table IV indicate that these larger silica particles were not as effective in preventing delamination as those of Examples 14 and 15.

EXAMPLE 17

Examples 14–16 were repeated, except that silica powders were replaced with colloid silica, Syton® HT-50 (DuPont), and two concentrations of oxazolidine were used (65% and 100%) rather than one (see Table III). The colloidal silica has an average surface area of 70 m²/g and an average particle size of 0.05 μm. A small amount of methyl cellulose was added as a thickener. The results shown in Table IV show a significant reduction in delamination, which is comparable to that of Examples 14 and 15.

EXAMPLE 18

Example 17 was repeated, except that only one oxazolidine was used, the amount of colloidal silica was decreased, and the amount of methyl cellulose was increased (see Table III). The results (Table IV) were substantially the same as those of Example 17.

EXAMPLE 19

Example 17 was repeated using Ludox® TM-50 (DuPont) rather than Syton® HT-50. This colloidal silica has an average surface area of 140 m²/g and an average particle size of 0.02 μm. The results (Table IV) were similar to, but slightly improved compared to those of Example 17.

EXAMPLE 20

Example 15 was repeated, except the amount of EH-5 silica powder was reduced and Syton® HT-50 colloidal silica was added. The results were similar to those of Example 15.

EXAMPLE 21

Example 20 was repeated, except the proportions of silica powder and colloidal silica were revised and a small amount of methyl cellulose was added as a thickener. The results (Table IV) were significantly improved compared to Example 20.

EXAMPLE 22

(COMPARATIVE)

The commercial PRF resorcinol resin was cured with Zoldine ZT-65 in a composition including KOH, water, and Min-U-Gel 400, a powdered clay (Floridin). The composition is given in Table III. The wet strength of this composition was tested as before, and results in Table IV show that, although better than the commercial hardener of Example 1, the delamination was significantly poorer than that of Examples 14, 15 and 17–21 where powdered silica and/or colloidal silica was used as a sorbent.

TABLE III

The Glue Composition for Examples 13–22

| Example Number | PRF resin[1] (g) | (g) | Zoldine ® ZT-65 (65%) (g) | 85% KOH (g) | Zoldine ® ZT-100 (g) | Thickener (g) | Water (g) | Sorbent Type and Amount (g) | Total Glue Weight (g) |
|---|---|---|---|---|---|---|---|---|---|
| 13 | 150 | 60[2] | | 6.3 | | | | | 216.3 |
| 13A | 150 | | 43.9 | | | | | | 193.9 |
| 14 | 150 | | 40.5 | 6.1 | | | 4.4 | Silprec U-23 10.6 | 211.6 |
| 15 | 150 | | 43.8 | 6.3 | | | 4.8 | EH-5 8.0 | 212.9 |
| 16 | 150 | | 40.9 | 6.3 | | | 4.5 | HK-400 8.9 | 210.6 |
| 17 | 150 | | 23.5 | 6.3 | 13.2 | MC[3] 0.6 | | Syton HT-50 21.2 | 214.8 |
| 18 | 150 | | 43.8 | 6.3 | | MC 0.9 | | Syton HT-50 14.9 | 215.9 |
| 19 | 150 | | 23.8 | 6.3 | 13.4 | MC 0.7 | | Ludox TM-50 21.4 | 199.2 |
| 20 | 150 | | 43.9 | 6.3 | | | | EH-5 5.3 Syton HT-50 9.8 | 215.3 |
| 21 | 150 | | 43.9 | 6.3 | | MC 0.2 | | EH-5 3.8 Syton HT-50 11.5 | 215.7 |
| 22 | 120[4] | | 29.2 | 4.5 | | | 8.2 | Min-U-Gel 400 6.2 | 168.1 |

[1]Commercial phenol-resorcinol-formaldehyde resin.
[2]Commercial hardener for PRF resin of (1).
[3]Methyl cellulose, Mn = 86k.
[4]The commercial resin from Example 1.

TABLE IV

Wet Strength and Gel Time Results for Examples 13–22

| Example Number | Hardener Feature | | Gel Time (Mins) | Individual Glueline Delamination (%) | | | | | Total Delamination (%) |
|---|---|---|---|---|---|---|---|---|---|
| | | | | 1 | 2 | 3 | 4 | 5 | |
| 13 | Commercial Hardener | | 55[2] | 14.6 | 13.7 | 16.6 | 14.7 | 14.7 | 74.3 |
| 13A | ZT ® 65: | | 18 | | | | | | |
| 14 | Silprec U-23:<br>KOH: | 7.1%[1]<br>4.2% | 36 | 0.0 | 1.0 | 4.8 | 3.3 | 2.5 | 11.4 |
| 15 | Cab-O-Sil EH-5:<br>KCH: | 5.3%<br>4.2% | 35 | 1.2 | 2.7 | 2.5 | 1.6 | 1.3 | 9.3 |
| 16 | Acematt HK400:<br>KOH: | 5.9%<br>4.2% | 37 | 3.8 | 11.7 | 5.5 | 14.2 | 8.4 | 43.6 |
| 17 | Syton HT-50:<br>MC:<br>KOH: | 14.1%<br>0.4%<br>4.2% | 37 | 0.2 | 3.2 | 2.1 | 2.7 | 0.9 | 9.1 |
| 18 | Syton HT-50:<br>MC:<br>KOH: | 9.9%<br>0.6%<br>4.2% | 38 | 0.2 | 0.9 | 1.6 | 3.2 | 2.7 | 8.6 |
| 19 | Ludox TM-50:<br>MC:<br>KOH: | 14.3%<br>0.5%<br>4.2% | 34 | 0.7 | 2.4 | 0.9 | 2.2 | 0.6 | 6.8 |
| 20 | EH-5:<br>Syton HT-50:<br>KOH: | 3.5%<br>6.5%<br>4.2% | 33 | 1.4 | 3.4 | 1.8 | 3.8 | 0.9 | 11.3 |
| 21 | EH-5:<br>Syton HT-50:<br>KOH:<br>MC: | 2.5%<br>7.7%<br>4.2%<br>0.1% | 35 | 0.6 | 2.2 | 0.9 | 1.9 | 0.4 | 6.0 |
| 22 | Min-U-Gel:<br>KOH: | 5.2%<br>3.8% | 36 | 8.7 | 12.8 | 0.4 | 8.1 | 3.9 | 33.9 |

[1]Use level is expressed in the percentage of PRF resin.
[2]Gel time done without the addition of KOH into PRF resin for Example 13 only.

What is claimed is:

1. A composition for hardening resorcinol resins comprising:

a. an oxazolidine compound having the formula

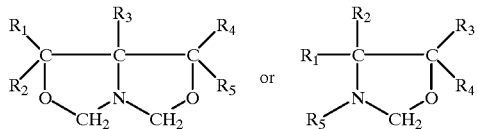

where $R_1$, $R_2$, $R_3$, $R_4$ and $R_5$ are independently hydrogen, hydroxyl, branched or straight chain alkyl, or branched or straight chain hydroxyl alkyl;

b. a base in an amount sufficient to retard the reaction of resorcinol resin with the oxazolidine compound of (a);

c. an amount of particulate silica effective to improve wet strength of hardened resorcinol resin; and d. an effective amount of water.

2. A composition of claim 1, wherein said base is an inorganic base selected from the group consisting of NaOH, KOH, LiOH, MgO, Ba(OH)$_2$, Ca(OH)$_2$, CaO, Mg(OH)$_2$, Al(OH)$_3$, and CsOH.

3. A composition of claim 1, wherein said particulate silica has an average particle size in the range of about 0.001–20 μm.

4. A composition of claim 1, wherein said particulate silica has a surface area in the range of about 20–1,000 m$^2$/g.

5. A composition of claim 1, wherein said particulate silica is a silica powder.

6. A composition of claim 1, wherein said particulate silica is colloidal silica.

7. A composition of claim 1, further comprising a thickener.

8. A composition of claim 5, further comprising a thickener.

9. A composition of claim 6, further comprising a thickener.

10. A composition of claim 1, wherein said particulate silica is a mixture of colloidal silica and silica powder.

11. A composition of claim 10, further comprising a thickener.

12. A composition of claim 1, comprising 10–80 wt. % oxazolidine, 0.5–30 wt. % base, and 0.5–30 wt. % particulate silica on a water-free basis.

13. A hardenable composition comprising:

a. a resorcinol resin;

b. an oxazolidine compound having the formula

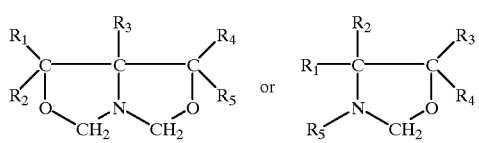

where $R_1$, $R_2$, $R_3$, $R_4$ and $R_5$ are independently hydrogen, hydroxyl, branched or straight chain alkyl, or branched or straight chain hydroxyl alkyl;

c. a base in an amount sufficient to retard the reaction of resorcinol resin of (a) with the oxazolidine compound of (b)(1);

d. an amount of particulate silica effective to improve wet strength of hardened resorcinol resin; and e. an effective amount of water.

14. A composition of claim 13, wherein said resorcinol resin is at least one member of the group consisting of resorcinol-formaldehyde, phenol-resorcinol-formaldehyde, tannin, tannin-formaldehyde, and tannin-phenol-formaldehyde resins.

15. A composition of claim 13, wherein said base is an inorganic base selected from the group consisting of NaOH, KOH, LiOH, MgO, $Ba(OH)_2$, $Ca(OH)_2$, CaO, $Mg(OH)_2$, $Al(OH)_3$, and CsOH.

16. A composition of claim 13, wherein said particulate silica has an average particle size in the range of about 0.001–20 μm.

17. A composition of claim 13, wherein particulate silica has a surface area in the range of about 20–1,000 $m^2/g$.

18. A composition of claim 13, wherein said particulate silica is a silica powder.

19. A composition of claim 13, wherein said particulate silica is colloidal silica.

20. A composition of claim 13, further comprising a thickener.

21. A composition of claim 18, further comprising a thickener.

22. A composition of claim 19, further comprising a thickener.

23. A composition of claim 13, wherein said particulate silica is a mixture of colloidal silica and silica powder.

24. A composition of claim 23, further comprising a thickener.

25. A composition of claim 13, wherein the resin is about 40–90 wt. % and the hardener is about 10–60 wt. % of the composition.

26. A composition comprising:
   a. two or more pieces of wood; and
   b. a cured composition of claim 13.

27. A method of bonding wood articles comprising gluing said articles with the composition of claim 13.

28. A composition of claim 13, wherein said resorcinol resin of (a) is first mixed with said base of (c), and thereafter mixed with the oxazolidine compound of (b), the particulate silica of (d) and the water of (e).

29. A composition of claim 28, wherein said resorcinol resin of (a) is first mixed with said base of (c), and thereafter mixed with the oxazolidine compound of (b) and the water of (e), and thereafter the combination of (a), (b), (c) and (e) is mixed with the silica of (d).

* * * * *